United States Patent
Ha et al.

(10) Patent No.: US 10,305,079 B2
(45) Date of Patent: May 28, 2019

(54) METHOD FOR MANUFACTURING SEPARATOR, SEPARATOR MANUFACTURED THEREFROM, AND ELECTROCHEMICAL DEVICE COMPRISING THE SAME

(71) Applicants: LG Chem, Ltd., Seoul (KR); TORAY INDUSTRIES, INC., Tokyo (JP)

(72) Inventors: Jeong-Min Ha, Daejeon (KR); Joo-Sung Lee, Daejeon (KR); Jin-Woo Kim, Daejeon (KR); Jong-Hun Kim, Daejeon (KR); Sun-Mi Jin, Daejeon (KR); Bo-Kyung Ryu, Daejeon (KR)

(73) Assignees: LG Chem, Ltd. (KR); TORAY INDUSTRIES, INC. (JP)

( * ) Notice: Subject to any disclaimer, the term of this patent is extended or adjusted under 35 U.S.C. 154(b) by 321 days.

(21) Appl. No.: 13/948,579

(22) Filed: Jul. 23, 2013

(65) Prior Publication Data
US 2013/0316219 A1 Nov. 28, 2013

Related U.S. Application Data (63) Continuation of application No. PCT/KR2012/011379, filed on Dec. 24, 2012.

(30) Foreign Application Priority Data

Dec. 27, 2011 (KR) .................. 10-2011-0143759
Dec. 21, 2012 (KR) .................. 10-2012-0150587

(51) Int. Cl.
*H01M 2/14* (2006.01)
*H01M 2/16* (2006.01)

(52) U.S. Cl.
CPC ........... *H01M 2/145* (2013.01); *H01M 2/166* (2013.01); *H01M 2/1646* (2013.01);
(Continued)

(58) Field of Classification Search
None
See application file for complete search history.

(56) References Cited

U.S. PATENT DOCUMENTS

| | | |
|---|---|---|
| 6,270,928 B1 | 8/2001 | Andrieu et al. |
| 6,274,276 B1 | 8/2001 | Andrieu et al. |

(Continued)

FOREIGN PATENT DOCUMENTS

| | | |
|---|---|---|
| JP | 11102686 | 4/1999 |
| JP | 2011512005 A | 4/2011 |

(Continued)

OTHER PUBLICATIONS

International Search Report for Application No. PCT/KR2012/011379 dated Apr. 19, 2013.

(Continued)

*Primary Examiner* — Barbara L Gilliam
*Assistant Examiner* — Angela J Martin
(74) *Attorney, Agent, or Firm* — Lerner, David, Littenberg, Krumholz & Mentlik, LLP (57) ABSTRACT

The present invention provides a method for manufacturing a separator, comprising the steps of (S1) preparing a porous planar substrate having multiple pores; (S2) coating a coating solution obtained by dissolving a binder polymer in a solvent and dispersing inorganic particles therein on the porous substrate to form a porous coating layer and drying the porous coating layer; and (S3) applying a binder solution on the surface of the dried porous coating layer to form an adhesive layer, wherein the binder solution has a surface energy of at least 10 mN/m higher than that of the porous coating layer and a contact angle of the binder solution to the surface of the porous coating layer maintained at 80° or more for 30 seconds. In accordance with the present invention, a separator capable of obtaining sufficient adhesion (Continued)

force with minimizing the amount of an adhesive used for the adhesion with an electrode, and minimizing the deterioration of battery performances can be easily manufactured.

15 Claims, 3 Drawing Sheets

(52) U.S. Cl.
CPC ....... *H01M 2/1653* (2013.01); *H01M 2/1686* (2013.01); *H01M 2/168* (2013.01)

(56) References Cited

U.S. PATENT DOCUMENTS

| | | | |
|---|---|---|---|
| 7,638,241 B2 | 12/2009 | Lee et al. | |
| 7,695,870 B2* | 4/2010 | Park et al. | 429/251 |
| 7,709,152 B2* | 5/2010 | Kim et al. | 429/251 |
| 8,338,019 B2* | 12/2012 | Lee et al. | 429/144 |
| 2005/0260490 A1* | 11/2005 | Persi | H01M 2/145 |
| | | | 429/144 |
| 2006/0105244 A1 | 5/2006 | Kejha et al. | |
| 2009/0111025 A1* | 4/2009 | Lee | H01M 2/166 |
| | | | 429/251 |
| 2009/0111026 A1* | 4/2009 | Kim | H01M 2/145 |
| | | | 429/252 |
| 2009/0155678 A1 | 6/2009 | Less et al. | |
| 2009/0291360 A1* | 11/2009 | Kim | H01M 2/1653 |
| | | | 429/145 |
| 2010/0323230 A1* | 12/2010 | Lee | H01M 2/166 |
| | | | 429/143 |
| 2011/0143185 A1 | 6/2011 | Nishikawa | |
| 2011/0259505 A1* | 10/2011 | Lee | H01M 2/145 |
| | | | 156/78 |
| 2012/0015232 A1* | 1/2012 | Teshima | H01M 4/1395 |
| | | | 429/145 |

FOREIGN PATENT DOCUMENTS

| | | |
|---|---|---|
| KR | 1020050016478 | 2/2005 |
| KR | 100727247 B1 | 6/2007 |
| KR | 100754746 B1 | 9/2007 |
| KR | 1020100058579 | 6/2010 |

OTHER PUBLICATIONS

Supplemental Search Report from European Application No. EP 12861790, dated Jun. 5, 2015.

* cited by examiner

METHOD FOR MANUFACTURING SEPARATOR, SEPARATOR MANUFACTURED THEREFROM, AND ELECTROCHEMICAL DEVICE COMPRISING THE SAME

CROSS-REFERENCE TO RELATED APPLICATION

This application is a continuation of International Application No. PCT/KR2012/011379 filed on Dec. 24, 2012, which claims priority to Korean Patent Application No. 10-2011-0143759 filed in the Republic of Korea on Dec. 27, 2011, and Korean Patent Application No. 10-2012-0150587 filed in the Republic of Korea on Dec. 21, 2012, the disclosures of which are incorporated herein by reference.

TECHNICAL FIELD

The present invention relates to a method for manufacturing a separator, a separator manufactured therefrom, and an electrochemical device comprising the separator. More particularly, the present invention relates to a method for manufacturing a separator, characterized by the formation of an adhesive layer by way of applying a binder solution whose surface energy is at least 10 mN/m higher than that of a porous coating layer and contact angle to the surface of the porous coating layer is maintained at 80° or more for 30 seconds, a separator manufactured therefrom, and an electrochemical device comprising the separator.

BACKGROUND ART

Recently, there has been an increasing interest in energy storage technology. As energy storage technologies are extended to devices such as cellular phones, camcorders and notebook PC, and further to electric vehicles, demand for the research and development of electrochemical devices is increasing.

In this regard, electrochemical devices are one of the subjects of great interest. Particularly, development of rechargeable secondary batteries has been the focus of attention. Recently, research and development of such batteries are focused on the designs of new electrodes and batteries to improve capacity density and specific energy.

Many secondary batteries are currently available. Among these, lithium secondary batteries developed in the early 1990's have drawn particular attention due to their advantages of higher operating voltages and much higher energy densities than conventional aqueous electrolyte-based batteries, for example, Ni-MH, Ni—Cd, and $H_2SO_4$—Pb batteries. However, such lithium ion batteries suffer from safety problems, such as fire and explosion, when encountered with the use of organic electrolytes and are disadvantageously complicated to fabricate. In attempts to overcome the disadvantages of lithium ion batteries, lithium ion polymer batteries have been developed as next-generation batteries. More research is still urgently needed to improve the relatively low capacities and insufficient low-temperature discharge capacities of lithium ion polymer batteries in comparison with lithium ion batteries.

Many companies have produced a variety of electrochemical devices with different safety characteristics. It is very important to evaluate and ensure the safety of such electrochemical devices. The most important consideration for safety is that operational failure or malfunction of electrochemical devices should not cause injury to users. For this purpose, regulatory guidelines strictly restrict potential dangers (such as fire and smoke emission) of electrochemical devices. Overheating of an electrochemical device may cause thermal runaway or a puncture of a separator may pose an increased risk of explosion. In particular, porous polyolefin substrates commonly used as separators for electrochemical devices undergo severe thermal shrinkage at a temperature of 100° C. or higher in view of their material characteristics and production processes including elongation. This thermal shrinkage behavior may cause electrical short between a cathode and an anode.

Figure 1:
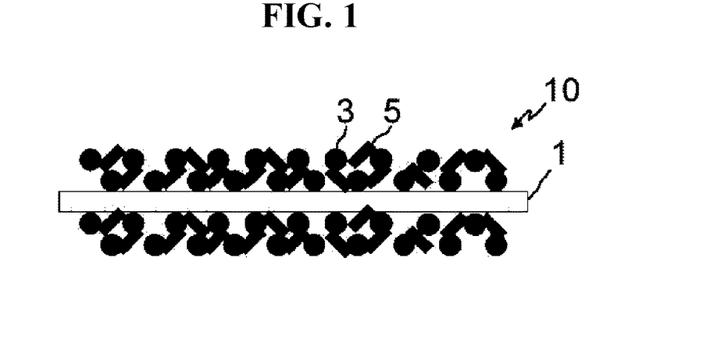
FIG. 1 schematically shows the cross-section of a separator having a porous coating layer.

In order to solve the above safety problems of electrochemical devices, as shown in FIG. 1, a separator 10 having a porous coating layer formed by coating a mixture of inorganic particles 3 and a binder polymer 5 on at least one surface of a porous substrate 1 has been proposed. In the separator, the inorganic particles 3 present in the porous coating layer formed on the porous substrate 1 act as a spacer capable of maintaining the physical form of the porous coating layer, thereby preventing the porous substrate from thermal shrinkage even if electrochemical devices overheat. Also, an interstitial volume is present between the inorganic particles to form a fine pore.

Such a separator is required to be adhesive to an electrode in a stacking and folding process, and therefore, it is preferred that an adhesive layer is significantly exposed on the porous substrate layer of the separator for good adhesion with the electrode. In this regard, there is a need to effectively form an adhesive layer on the porous substrate layer of a separator.

DISCLOSURE

Technical Problem

Accordingly, it is an object of the present invention to provide a method for manufacturing a separator, which can form a small amount of an electrode-adhesive layer with minimizing the blockage of the pores of the separator and without deteriorating the thermal stability of the separator, thereby providing good assembling characteristics to the separator and preventing the deterioration of battery performances, a separator manufactured therefrom, and an electrochemical device comprising the separator.

Technical Solution

In accordance with one aspect of the present invention, there is provided a method for manufacturing a separator, comprising:

(S1) preparing a porous planar substrate having multiple pores;

(S2) coating a coating solution obtained by dissolving a binder polymer in a solvent and dispersing inorganic particles therein on the porous substrate to form a porous coating layer and drying the porous coating layer; and (S3) applying a binder solution on the surface of the dried porous coating layer to form an adhesive layer, wherein the binder solution has a surface energy of at least 10 mN/m higher than that of the porous coating layer and a contact angle of the binder solution to the surface of the porous coating layer is maintained at 80° or more for 30 seconds.

The application of the binder solution on the surface of the dried porous coating layer may be carried out by way of a spraying, ink-jet printing, laser printing, screen printing or dispensing method.

The porous substrate may be made of a polyolefin-based polymer, and have a thickness of 1 to 100 μm.

The inorganic particles may have an average diameter of 0.001 to 10 μm, and may include inorganic particles having a dielectric constant of 5 or higher and inorganic particles having the ability to transport lithium ions, which may be used alone or in a mixture.

The contact angle of the binder solution to the surface of the porous coating layer may be maintained at 80° or more for 30 seconds.

The surface energy of the binder solution may be higher than that of the porous coating layer by 10 to 50 mN/m.

The binder solution may comprise at least one polymer selected from the group consisting of styrene-butadiene copolymer, (meth)acrylic acid copolymer, (meth)acrylate copolymer, styrene-(meth)acrylate copolymer, polyacrylonitrile, polyvinyl chloride, polyfluoro-compounds, polyvinyl alcohol and polycyanoacrylate; and at least one solvent selected from the group consisting of water, glycerol, ethylene glycol, propylene glycol, dimethyl sulfoxide, dimethylformamide, acetonitrile, ethylene carbonate, furfuryl alcohol and methanol.

The polymer may be used in an amount of 1 to 50 parts by weight based on 100 parts by weight of the solvent.

In accordance with another aspect of the present invention, there is provided a separator obtained by the above-mentioned manufacturing method.

In accordance with still another aspect of the present invention, there is provided an electrochemical device comprising a cathode, an anode and a separator interposed between the cathode and the anode, wherein the separator is the above-mentioned separator.

The electrochemical device may be a lithium secondary battery.

Advantageous Effects

The separator of the present invention exhibits the following effects.

First, an adhesive layer is formed by applying a binder solution on the surface of a porous coating layer so that the contact angle of the binder solution to the surface of the porous coating layer is maintained at 80° or more for 30 seconds, thereby minimizing the blockage of the pores of the separator and significantly preventing the transferring rate of lithium ions from being reduced, and ultimately improving an adhesion with an electrode as well as reducing resistance.

Second, the binder solution has a higher surface energy than that of the porous coating layer to form the adhesive layer, which is configured for adhesion with an electrode, in a locally narrow area, thereby obtaining sufficient adhesion force with minimizing the amount of an electrode adhesive.

Third, as the binder of the electrode-adhesive layer is minimized, a minimum amount of the binder comes in contact with an electrode, thereby preventing the deterioration of battery performances.

BEST MODE

Hereinafter, preferred embodiments of the present invention will be described in detail with reference to the drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

In the separator of the present invention, the porous substrate having multiple pores may be any one which is conventionally used in the separator of electrochemical devices, for example, a substrate in the form of a membrane or a fiber obtained from polyethylene terephthalate, polybutylene terephthalate, polyester, polyacetal, polyamide, polycarbonate, polyimide, polyetheretherketone, polyethersulfone, polyphenylene oxide, polyphenylene sulfide, polyethylene naththalate, polyvinyledene fluoride, polyethylene oxide, polyacrylonitrile, polyvinyledene fluoride, hexafluoropropylene copolymer, polyethylene, polypropylene, or a mixture thereof.

The thickness of the porous substrate is not particularly limited, but preferably 5 to 50 μm. Also, the size of pores present in the porous substrate and the porosity thereof are not particularly limited, but preferably 0.001 to 50 μm and 10 to 99%, respectively.

In the separator-manufacturing method of the present invention, the inorganic particles used to form the porous coating layer on the surface of the porous substrate may have an average diameter of 0.001 to 10 μm, and may include inorganic particles having a dielectric constant of 5 or higher and inorganic particles having the ability to transport lithium ions, which may be used alone or in a mixture.

In the separator-manufacturing method of the present invention, the binder polymer used to form the porous coating layer on the surface of the porous substrate may be any one which is conventionally used in the formation of a porous coating layer together with inorganic particles, preferably one having a solubility parameter of 15 to 45 MPa$^{1/2}$. The binder polymer plays a role of connecting and immobilizing inorganic particles therebetween. Non-limited examples of the binder polymer may include polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer and polyimide, which may be used alone or in a mixture In the separator according to one embodiment of the present invention, the inorganic particles used to form the porous coating layer are not particularly limited if they are electrochemically stable. That is, the inorganic particles which may be used in the present invention are not particularly limited unless an oxidation-reduction reaction occurs in an operating voltage range (for example, 0 to 5 V based on Li/Li$^+$) of an applied electrochemical device. Particularly, inorganic particles having the ability to transport lithium ions may be used to increase an ionic conductivity in electrochemical devices, thereby enhancing the performances thereof. Also, inorganic particles having a high dielectric constant may be used to increase a dissociation rate of an electrolyte salt, e.g., a lithium salt, in a liquid electrolyte, thereby improving an ionic conductivity of the electrolyte. For the above-mentioned reasons, the inorganic particles used in the present invention preferably include inorganic particles having a dielectric constant of 5 or higher, preferably 10 or higher, inorganic particles having the ability to transport lithium ions, or a mixture thereof. Non-limiting examples of the inorganic particles having a dielectric constant of 5 or higher include $BaTiO_3$, $Pb(Zr_x,Ti_{1-x})O_3$ (PZT), $Pb_{1-x}La_xZr_{1-y}Ti_yO_3$ (PLZT), $Pb(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, $TiO_2$, SiC inorganic particles and a mixture thereof.

Among these, inorganic particles such as $BaTiO_3$, $Pb(Zr_x,Ti_{1-x})O_3$ (PZT), $Pb_{1-x}La_xZr_{1-y}Ti_yO_3$ (PLZT), $Pb(Mg_3Nb_{2/3})O_3$—$PbTiO_3$ (PMN-PT), hafnia ($HfO_2$) have high dielectric characteristic from a dielectric constant of 100 or more, and have piezoelectricity, which can generate a charge when tensioned or compressed by the application of a certain pressure and then a potential difference between both surfaces, to prevent a short circuit due to external impact in both electrodes, thereby improving the safety of electrochemical devices. Also, when the above-mentioned inorganic particles having a high dielectric constant and inorganic particles having the ability to transport lithium ions are mixed with each other, their synergistic effects may increase.

In the present invention, the inorganic particles having the ability to transport lithium ions, i.e., lithium-containing inorganic particles which can transfer lithium ions without holding them, is capable of transporting and transferring lithium ions due to a kind of defect present within a particle structure, thereby improving the conductivity of lithium ions in a battery and ultimately enhancing the performances of the battery. Non-limiting examples of the inorganic particles having the ability to transport lithium ions include lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), $(LiAlTiP)_xO_y$ type glass (0<x<4, 0<y<13) such as $14Li_2O$-$9Al_2O_3$-$38TiO_2$-$39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5) such as $Li_{3.25}Ge_{0.25}P_{0.75}S_4$, lithium nitride ($Li_xN_y$, 0<x<4, 0<y<2) such as $Li_3N$, $SiS_2$ type glass ($Li_xSi_yS_z$, 0<x<3, 0<y<2, 0<z<4) such as $Li_3PO_4$—$Li_2S$—$SiS_2$, $P_2S_5$ type glass ($Li_xP_yS_z$, 0<x<3, 0<y<3, 0<z<7) such as LiI—$Li_2S$—$P_2S_5$, and a mixture thereof.

In the separator according to one embodiment of the present invention, the inorganic particles are not particularly limited to their size, but preferably have an average diameter of 0.001 to 10 μm for the formation of a coating layer having a uniform thickness and a proper porosity.

In the separator according to one embodiment of the present invention, the inorganic particles and the binder polymer of the porous coating layer have a weight ratio of 50:50 to 99:1, preferably 70:30 to 95:5. When the content ratio of the inorganic particles to the binder polymer is less than 50:50, the content of the binder polymer may increase to hinder the thermal safety improvement of the separator, and an empty space formed between the inorganic particles is reduced to decrease the pore size and porosity, thereby ultimately deteriorating the battery performances. When the content of the inorganic particles is higher than 99 parts by weight, the content of the binder polymer is so small that the anti-peeling property of the porous coating layer may weaken. The thickness of the porous coating layer formed from the inorganic particles and the binder polymer is not particularly limited, but preferably 0.01 to 20 μm. Also, the pore size and the porosity of the porous coating layer are not particularly limited, but preferably, a preferred pore size is in the range of 0.001 to 10 μm, and a preferred porosity is in the range of 10 to 99%. The pore size and porosity are largely dependent on the size of the inorganic particles. For example, the diameter of the inorganic particles is 1 μm or less, a pore is formed in a size of about 1 μm or less. Such a pore structure is filled with an electrolyte solution which will be introduced later, and the filled electrolyte solution plays a role of transferring ions.

In the separator-manufacturing method of the present invention, an adhesive layer is formed by applying a binder solution on the surface of a porous coating layer so that the contact angle of the binder solution to the surface of the porous coating layer is maintained at 80° or more for 30 seconds, thereby minimizing the blockage of pores which is caused by the infiltration of the binder solution into the pores by capillary force when the binder solution drops on the porous coating layer.

That is, in the present invention, the binder solution is capable of maintaining a contact angle to the porous coating layer at 80° or more for 30 seconds and forms an adhesive layer, thereby preventing the binder solution from spontaneously penetrating into a capillary tube, from which the blockage of the pores can be prohibited. The capillary force may be calculated by the following Equation (I):

$$\Delta \rho g h = \frac{2\delta \cos\theta}{r} \qquad (I)$$

wherein,

δ is a liquid-air surface tension (force/unit length);

θ is a contact angle;

ρ is a liquid density (mass/volume);

g is a strength of a local gravitational field (force/unit mass)

r is a radius of a capillary tube.

In Equation (I), in the condition that the other parameters excluding the contact angle (θ) are fixed, when the contact angle (θ) is 90° or more, the binder solution cannot spontaneously penetrate into the capillary tube, thereby failing to infiltrate into the pores, whereas when the contact angle (θ) is less than 90°, the binder solution infiltrates into the pores by the capillary force, thereby blocking the pores.

In accordance with the separator-manufacturing method of the present invention, since the drops of the binder solution are rapidly dried and are very small in size, if a contact angle (θ) is 80° or more, the drying rate is faster than their infiltrating rate into the pores, thereby sufficiently accomplishing the desired object of the present invention.

In the present invention, the application of the binder solution on the surface of the dried porous coating layer is not particularly limited if the contact angle of the binder solution to the porous coating layer is maintained at 80° or more for 30 seconds. The non-limited examples of the application may include spraying, ink-jet printing, laser printing, screen printing or dispensing methods which are well known in the art, and their specific application may be carried out to comply with the desired object of the present invention according to conventional methods known to the arts.

Figure 2:
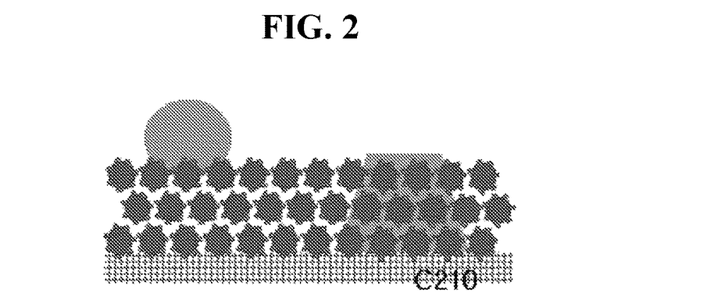
FIG. 2 shows a view illustrating the blockage of pores by a binder solution.

FIG. 2 shows a view illustrating the blockage of pores by a binder solution. The left of the view illustrates the prevention of a binder solution having a contact angle of 80° or more according to one embodiment of the present invention from penetrating into a capillary tube, whereas the right of the view illustrates the penetration of a binder solution having a contact angle less than 80° into the capillary tube.

Thus, in accordance with one embodiment of the present invention, the present invention is characterized in that a binder solution is applied so that the contact angle of the binder solution to a porous coating layer is maintained at 80° or more, preferably 80 to 130°, more preferably 90 to 120° for a drying time of an adhesive layer, for example, 30 seconds, thereby minimizing the blockage of pores by an adhesive.

Figure 5A:
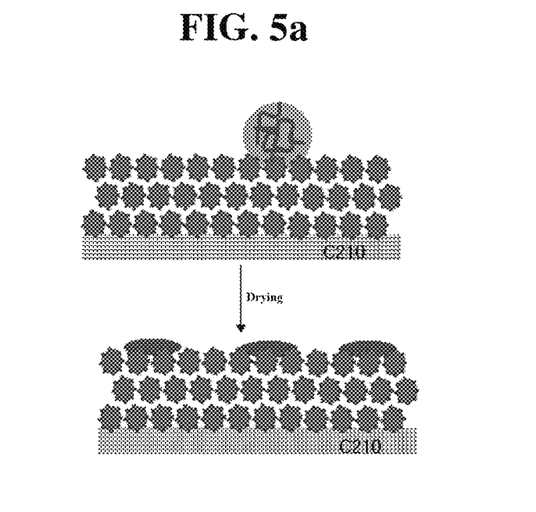
FIG. 5a shows a procedure for forming an adhesive layer by applying a binder solution by way of a spraying method in accordance with one embodiment of the present invention.
Figure 5B:
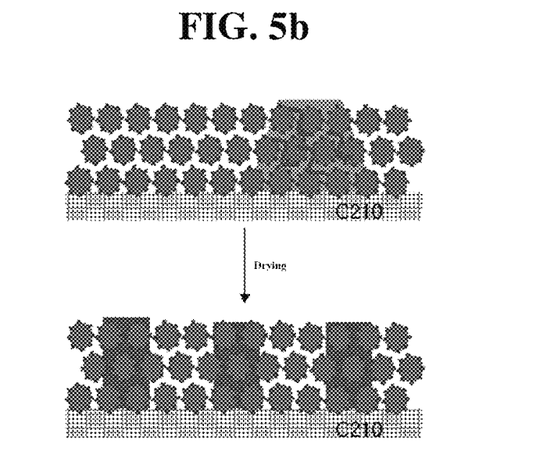
FIG. 5b shows a procedure for forming an adhesive layer by applying a binder solution by way of a conventional spreading and filling method.

FIG. 5a shows a procedure for forming an adhesive layer by applying a binder solution by way of a spraying method in accordance with one embodiment of the present invention, and FIG. 5b shows a procedure for forming an adhesive layer by applying a binder solution by way of a conventional spreading and filling method. That is, in FIG. 5a, it can be confirmed that the blockage of pores is minimized to significantly prevent the transferring rate of lithium ions from being reduced, thereby improving an adhesion with an electrode and reducing resistance. In contrast, in the conventional method of FIG. 5b, the blockage of pores occurs to largely reduce the transferring rate of lithium ions, thereby deteriorating an adhesion with an electrode and increasing resistance.

Also, in accordance with the separator-manufacturing method of the present invention, the surface energy of the binder solution is at least 10 mN/m, preferably 10 to 50 mN/m, more preferably 20 to 50 mN/m higher than that of the porous coating layer.

When a difference between the surface energy of the binder solution and that of the porous coating layer satisfies the above range, an adhesive layer is formed in a locally narrow area to minimize the damage of pores and the reduction of a lithium ion-transferring rate, improve an adhesion with an electrode, reduce resistance, and improve the assembling of a battery and the performances thereof.

Figure 4:
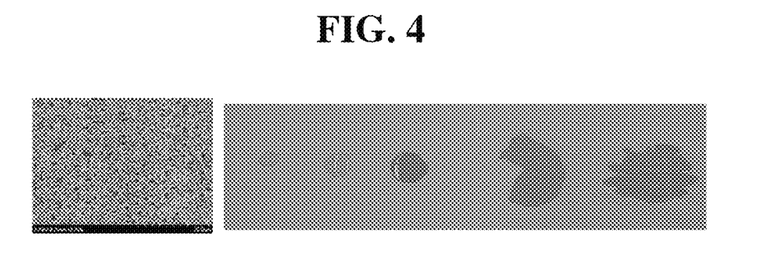
FIG. 4 shows an SEM photograph (left) of a porous coating layer according to one embodiment of the present invention and a photograph (right) exhibiting the form of drops in a porous coating layer depending on a solvent.

FIG. 4 shows an SEM photograph (left) of a porous coating layer according to one embodiment of the present invention and a photograph (right) exhibiting the form of drops in a porous coating layer depending on a solvent. In the right photograph, water, ethylene glycol, dimethyl sulfoxide (DMSO), acetone, and hydrogen halide are each used as a solvent from left to right.

Meanwhile, depending on each solvent used, the surface energy of the binder solution and the contact angle thereof to the porous coating layer, as well as the surface energy of the porous coating layer are shown in Table 1.

Referring to FIG. 4 and Table 1, the surface energy of the binder solution may be in the range of about 35 mN/m or higher since the surface energy of the porous coating layer is conventionally in the range 15 to 25 mN/m. Also, as the surface energy of the binder solution increases, the contact angle thereof increases, and the drops of water, ethylene glycol, DMSO, acetone and hydrogen halide on the porous coating layer decreases in their spreading and has circular forms.

TABLE 1

| | Solvent | | | | | |
|---|---|---|---|---|---|---|
| | Water | Ethylene Glycol | DMSO | Acetone | Hydrogen Halide | Porous Coating Layer |
| Surface Energy (mN/m) | 72-73 | 47-48 | 43-44 | 22-23 | 18-19 | 15-25 |
| Contact Angle to Porous Coating Layer (30 seconds) | 110 | 95 | 88 | 0 (Infiltrated) | 0 (Infiltrated) | — |

As can be seen from Table 1, the surface energy of water is 72 to 73 mN/m, which is at least 20 mN/m higher than that of the porous coating layer, and the contact angle thereof to the porous coating layer is maintained at 90° or more, and therefore, this binder solution is most suitable to be used in one embodiment of the present invention.

In the separator according to one embodiment of the present invention, the binder solution comprises a polymer and a solvent, which should be understood as components separate from a binder polymer for forming the porous coating layer. The polymer of the binder solution may be any polymer which is capable of accomplishing the desired object of the present invention for increasing a bonding force between an electrode and a separator with minimizing pore damage, for example, a natural rubber or a synthetic rubber may be used alone or in a mixture in terms of increasing the bonding force.

The specific examples of the polymer of the binder solution may include styrene-butadiene copolymer, (meth)acrylic acid copolymer, (meth)acrylate copolymer, styrene-(meth)acrylate copolymer, polyacrylonitrile, polyvinyl chloride, polyfluoro-compounds, polyvinyl alcohol and polycyanoacrylate. Since the polymer exhibits a low impregnation rate to an electrolyte solution, it is unlikely to be dissolved or deformed in a battery.

In addition, the polymer may be further copolymerized with a monomer containing a hydrophilic functional group to increase the bonding effect through a proper interaction with an electrode. The examples of the hydrophilic functional group may be maleic acid, acrylic acid, acrylate, carboxylic acid, nitrile, hydroxyl, mercapto, ether, ester, amide, amine, acetate, halogen groups, etc., and at least one or two thereof may be contained in a monomer.

Particularly, in one embodiment of the present invention, the styrene-butadiene copolymer forming an adhesive layer may be controlled to comprise a styrene unit and a butadiene unit in an amount of 1 to 99 wt %, respectively. The amount of the styrene unit is suitably controlled not to exceed 50 wt %. Also, any other monomers may be further copolymerized, and also any other additives, e.g., viscosity agents such as a silane coupling agent may be further mixed, unless they hinder the object of the present invention. The weight-average molecular weight ($M_w$) of the styrene-butadiene copolymer is not particularly limited, but is preferably in the range of 10,000 to 1,000,000.

Accordingly, as a solvent of the binder solution, a solvent having a relatively high surface energy, for example, water, glycerol, ethylene glycol, propylene glycol, dimethyl sulfoxide, dimethylformamide, acetonitrile, ethylene carbonate, furfuryl alcohol and methanol may be used.

In the binder solution, the polymer for forming an adhesive layer, for example, may be used in an amount of 1 to 50 parts by weight, preferably 5 to 40 parts by weight, more preferably 10 to 40 parts by weights, based on 100 parts by weight of the solvent. When the amount of the polymer satisfies such a range, the viscosity of the solution may be controlled in the range of 10 to 5,000 cp to provide easy handling and improved spray application, thereby forming an adhesive layer having a uniform thickness.

In one embodiment of the present invention, a dot pattern forming an adhesive layer have various arrangements, dot sizes and dot forms within a range capable of maintaining the lithium ion-transferring ability of the porous coating layer with minimizing pore damage and improving a bonding force to an electrode. For example, the dot pattern may consist of dots having a random size of several to hundreds of μm, e.g., 1 to 200 μm, preferably 1 to 100 μm. When the size of dots satisfies such a range, it is possible to prevent a passage for transferring lithium ions from being localized and improve an adhesion with an electrode. Also, the dots are not particularly limited to their forms, but may be largely coated in a form like a circle or oval by generally applying the binder solution in the form of a drop on a substrate by way of spraying, followed by drying.

Figure 3:
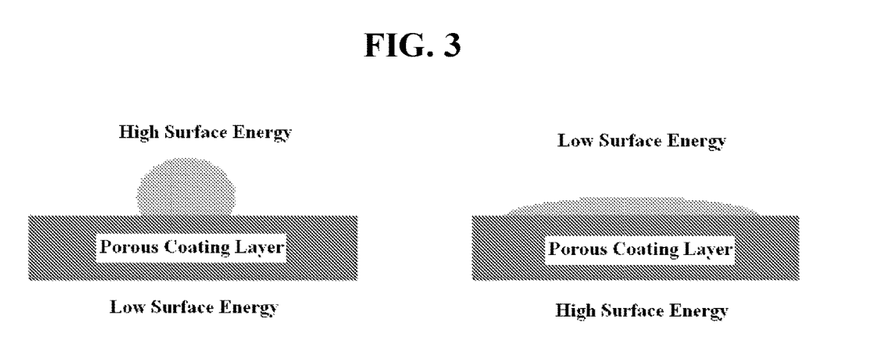
FIG. 3 shows views illustrating the area of an adhesive layer formed depending on the surface energy of a binder solution applied on a porous coating layer, the left view being a separator manufactured according to one embodiment of the present invention, and the right view being a separator manufactured according to a conventional manufacturing method.

FIG. 3 shows views illustrating the area of an adhesive layer formed depending on the surface energy of a binder solution applied on a porous substrate layer, more specifically, the left view illustrates the formation of an adhesive layer having a locally narrow area by applying a binder solution having a surface energy higher than that of the porous coating layer according to one embodiment of the present invention, and the right view illustrates the formation of an adhesive layer having a wide area due to distinct spreading by applying a binder solution having a surface energy lower than that of the porous coating layer.

Also, in accordance with one embodiment of the present invention, the application of a binder solution may be carried out by way of spraying, thereby allowing the reduction of production cost and provision of a high production rate, as well as the effective formation of discontinuous dots having a size of several to hundreds of μm at a high speed (40 m/min or more) and the use of a binder solution having a wide viscosity range.

The separator according to one embodiment of the present invention thus manufactured may be used in an electrochemical device by interposing between a cathode and an anode. The electrochemical device includes any device in which electrochemical reactions may occur, and specific examples of the electrochemical device include all kinds of primary batteries, secondary batteries, fuel cells, solar cells or capacitors such as a super capacitor. In particular, among the secondary batteries, lithium secondary batteries including a lithium metal secondary battery, a lithium ion secondary battery, a lithium polymer secondary battery or a lithium ion polymer secondary battery are preferred.

The electrochemical device may be manufactured by a conventional method known in the art, for example, by interposing the foregoing separator between a cathode and an anode and assembling them, and then introducing an electrolyte solution.

The separator of the present invention may be used together with any electrode which is not particularly limited, and the electrode may be manufactured by binding an electrode active material to an electrode current collector according to a conventional method known in the art. A cathode active material may be any of those that are commonly used in cathodes of conventional electrochemical devices. Non-limiting examples of the cathode active material include lithium manganese oxides, lithium cobalt oxides, lithium nickel oxides, lithium iron oxides, and lithium composite oxides thereof. An anode active material may be any of those that are commonly used in anodes of conventional electrochemical devices. Non-limiting examples of the anode active material include lithium, lithium alloys, and lithium intercalation materials such as carbon, petroleum coke, activated carbon, graphite and other carbonaceous materials. Non-limiting examples of a cathode current collector include aluminum foils, nickel foils and a combination thereof. Non-limiting examples of an anode current collector include copper foils, gold foils, nickel foils, copper alloy foils and a combination thereof.

In one embodiment of the present invention, an electrolyte consisting of a salt and an organic solvent capable of dissolving or dissociating the salt may be used. The salt has a structure represented by $A^+B^-$ wherein $A^+$ is an alkali metal cation such as $Li^+$, $Na^+$, $K^+$ and a combination thereof and $B^-$ is an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and a combination thereof. Examples of organic solvents suitable for dissolving or dissociating the salt include, but are not limited to, propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone and a mixture thereof.

The electrolyte may be introduced in any suitable step during the manufacturing of a battery depending on the manufacturing processes and desired physical properties of a final product. Specifically, the electrolyte may be introduced before battery assembly or in the final step of battery assembly.

Also, the separator according to one embodiment of the present invention may be applied in a battery by conventional winding, lamination or stacking with an electrode, and folding processes.

MODE FOR INVENTION

Hereinafter, various preferred examples of the present invention will be described in detail for better understanding. However, the examples of the present invention may be modified in various ways, and they should not be interpreted as limiting the scope of the invention. The examples of the present invention are just for better understanding of the invention to persons having ordinary skill in the art.

Manufacture of Separator

Example 1

To acetone, polyvinylidene fluoride-co-hexafluoropropylene (PVdF-HFP) copolymer as a polymer was added in an amount of 5 wt % and dissolved at 50° C. for about 12 hours or more to prepare a binder polymer solution. To the binder polymer solution, $Al_2O_3$ powders were added so that the weight ratio of the binder polymer and the $Al_2O_3$ powders is 10:90, and the $Al_2O_3$ powders were pulverized and dispersed for 12 hours or more by means of a ball mill to prepare a slurry. The particle size of $Al_2O_3$ present in the slurry prepared thus was about 400 nm. The slurry was coated on a porous polyethylene membrane having a thickness of 12 μm and a porosity of 45% by way of a dip coating method, and the coating thickness was controlled in a thickness of about 20 μm.

The porous coating layer formed on the porous polyethylene membrane was measured for its pore size and porosity by means of a porosimeter, and as a result, the pore size and the porosity of the porous coating layer were 0.4 μm and 55%, respectively.

Then, a binder solution obtained by dissolving 20 parts by weight of styrene-butadiene copolymer (LG CHEM, LTD., BA35™, $M_w$: about 100,000) in 100 parts by weight of water was sprayed on the porous coating layer in an area of a 300 nm-width at a pressure of 0.4 Mpa by means of a spray gun (DEVILBISS, Luna Gun) so that flat spray patterns were obtained, followed by drying in a 6 m-hot air oven set to 40° C. under the operation condition of 30 m/min, to form an adhesive layer. Thereby, a separator having an adhesive layer was prepared.

In the separator, the surface energy of the styrene-butadiene copolymer-containing aqueous binder solution was 62 mN/m, which is 34 mM/m higher than that of the porous coating layer (28 mM/m).

Also, the contact angle of the binder solution to a surface of the porous coating layer was maintained at 105° for 30 seconds.

Such surface energy and contact angle were measured by means of a contact angle-measuring equipment (KRUSS, Model Name: DSA100).

Figure 6A:
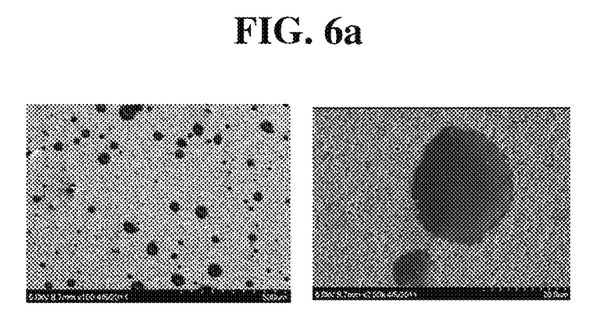
FIG. 6a shows SEM photographs of the adhesive layer of the separator manufactured in Example 1.
Figure 6B:
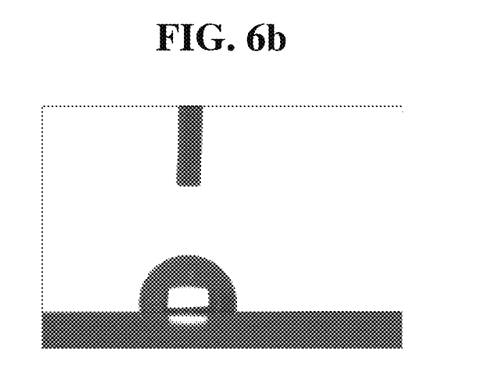
FIG. 6b shows a photograph of a contact angle formed when a binder solution for forming an adhesive layer is dropped on a porous coating layer.

FIG. 6a shows SEM photographs of the adhesive layer of the separator manufactured in Example 1, and FIG. 6b shows a photograph of a contact angle formed when the binder solution for forming an adhesive layer was dropped on the porous coating layer in Example 1.

As can be seen from FIGS. 6a and 6b, the binder was closely applied in the form of circles having a size of several to hundreds μm on the surface of the porous coating layer by means of a spraying process.

Example 2

The procedures of Example 1 were repeated except that a binder solution obtained by dissolving 10 parts by weight of polyvinyl pyrrolidone (Aldrich, $M_w$: 55,000) in 100 parts by weight of water was used, to prepare a separator having an adhesive layer.

In the separator, the contact angle of the binder solution to the porous coating layer was maintained at 85° for 30 seconds.

Example 3

The procedures of Example 1 were repeated except that a binder solution obtained by dissolving 10 parts by weight of polyethylene glycol (Aldrich, $M_w$: 8,000) in 100 parts by weight of water was used, to prepare a separator having an adhesive layer.

In the separator, the contact angle of the binder solution to a surface of the porous coating layer was maintained at 93° for 30 seconds.

Comparative Example 1

The procedures of Example 1 were repeated except that a binder solution obtained by dissolving 20 parts by weight of cyanoacylate resin (Shinetsu, $M_w$: 300,000) in 10 parts by weight of acetone was used, to prepare a separator.

In the separator, the contact angle of the binder solution to a surface of the porous coating layer was 0°. That is, the binder solution was immersed into the porous coating layer directly when it was dropped, thereby failing to form a close electrode-adhesive layer on the porous coating layer.

Figure 7:
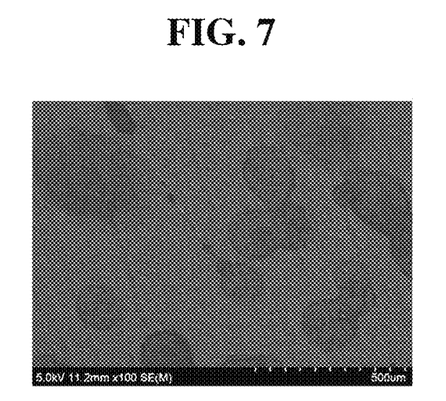
FIG. 7 shows an SEM photograph of the adhesive layer of the separator manufactured in Comparative Example 1.

FIG. 7 shows an SEM photograph of the adhesive layer of the separator manufactured in Comparative Example 1. In FIG. 7, the binder solution was seen to be merely spread after dropping, and a close electrode-adhesive layer cannot be confirmed.

Comparative Example 2

The procedures of Example 1 were repeated except that a binder solution obtained by dissolving 20 parts by weight of acrylate copolymer (ethyl acrylate:butyl acrylate:acrylonitrile:isobutyl acrylate=40:30:10:20 (wt %), $M_w$: 400,000) in 100 parts by weight of water was used, to prepare a separator.

Air Permeability Test of Separator

The separators manufactured in Examples 1 to 3 and Comparative Examples 1 and 2 were cut into a 50 mm×50 mm piece. For each sample prepared thus, the time (seconds) taken for 100 ml of air to pass through each sample was measured, and the results thereof are shown in Table 2.

Adhesiveness Test of Separator

Each of the separators manufactured in Examples 1 to 3 and Comparative Examples 1 and 2 was folded and laminated in a polyethylene terephthalate (PET) release film, followed by binding at 100° C. using a roll laminator. The bound separator was cut into a piece having a width of 15 mm and a length of 120 mm, and then measured for force (gf/15 mm) required to release the bound separator using a tensile strength-measuring instrument. The results thereof are shown in Table 2.

Resistance Test of Separator

Each of the separators manufactured in Examples 1 to 3 and Comparative Examples 1 and 2 was sufficiently wet in an electrolyte solution (ethylene carbonate:ethyl methyl carbonate=1:2 (vol %)), and the wet separator was used to prepare a coin-type cell. Each coin-type cell prepared was left at room temperature for 1 day and measured for its resistance by way of an impedance measuring method. The results thereof are shown in Table 2.

TABLE 2

| | Thickness (μm) | Air permeability (second/100 ml) | Adhesiveness (gf/15 mm) | Resistance (Ω) |
|---|---|---|---|---|
| Ex. 1 | 20~21 | 330~370 | 42~48 | 1.5~1.6 |
| Ex. 2 | 20~21 | 335~370 | 32~40 | 1.5~1.6 |

TABLE 2-continued

|  | Thickness (μm) | Air permeability (second/100 ml) | Adhesiveness (gf/15 mm) | Resistance (Ω) |
|---|---|---|---|---|
| Ex. 3 | 20~21 | 340~380 | 27~35 | 1.5~1.6 |
| Com. Ex. 1 | 19.5~20.5 | 360~420 | 0 (Adhesion Failure) | 1.7~2.0 |
| Com. Ex. 2 | 19.5~20.5 | 400~440 | 0 (Adhesion Failure) | 1.8~2.0 |

In Table 2, the term 'thickness' refers to the total thickness of a separator having an electrode-adhesive layer, and the thickness of the separator before forming the electrode-adhesive layer was about 20 μm. In the separators of Examples 1 to 3, an electrode-adhesive layer was effectively formed to provide increased thickness within a measurable error range, whereas the separators of Comparative Examples 1 and 2 did not substantially increase in their thickness.

Also, it can be confirmed that the separators of Examples 1 to 3 exhibited increased air permeability, adhesiveness and electrical resistance characteristics as compared with the separators of Comparative Examples 1 and 2.

What is claimed is:

1. A method for manufacturing a separator, comprising:
   (S1) preparing a porous planar substrate having multiple pores;
   (S2) coating a coating solution obtained by dissolving a binder polymer in a solvent and dispersing inorganic particles therein on the porous substrate to form a porous coating layer and drying the porous coating layer;
   (S3) applying a binder solution on the surface of the dried porous coating layer by way of a spraying, ink-jet printing, laser printing, screen printing or dispensing method;
   (S4) maintaining a contact angle of the binder solution to the surface of the porous coating layer at 80° or more for 30 seconds; and
   (S5) forming an adhesive layer,
   wherein the binder solution consists of:
   at least one polymer selected from the group consisting of styrene-butadiene copolymer, (meth)acrylic acid copolymer, (meth)acrylate copolymer, styrene-(meth)acrylate copolymer, polyacrylonitrile, polyvinyl chloride, polyfluoro-compounds, polyvinyl alcohol and polycyanoacrylate; and
   at least one solvent selected from the group consisting of water, glycerol, ethylene glycol, propylene glycol, dimethyl sulfoxide, dimethylformamide, acetonitrile, ethylene carbonate, furfuryl alcohol and methanol,
   wherein the polymer is optionally further copolymerized with a monomer containing a hydrophilic functional group selected from the group consisting of maleic acid, acrylic acid, acrylate, carboxylic acid, nitrile, hydroxyl, mercapto, ether, ester, amide, amine, acetate, halogen and mixtures thereof, and
   wherein the binder solution has a surface energy of at least 10 mN/m higher than that of the porous coating layer.

2. The method for manufacturing a separator according to claim 1, wherein the porous substrate is a porous polyolefin-based membrane.

3. The method for manufacturing a separator according to claim 1, wherein the porous substrate has a thickness of 1 to 100 μm.

4. The method for manufacturing a separator according to claim 1, wherein the inorganic particles have an average diameter of 0.001 to 10 μm.

5. The method for manufacturing a separator according to claim 4, wherein the inorganic particles are selected from inorganic particles having a dielectric constant of 5 or higher, inorganic particles having the ability to transport lithium ions, and a mixture thereof.

6. The method for manufacturing a separator according to claim 5, wherein the inorganic particles having a dielectric constant of 5 or higher are selected from the group consisting of $BaTiO_3$, $Pb(Zr,Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $Y_2O_3$, $Al_2O_3$, SiC, $TiO_2$ inorganic particles and a mixture thereof.

7. The method for manufacturing a separator according to claim 5, wherein the inorganic particles having the ability to transport lithium ions are selected from the group consisting of lithium phosphate (Li3PO4), lithium titanium phosphate ($Li_xTi_y(PO_4)_3$, $0<x<2$, $0<y<3$), lithium aluminum titanium phosphate (LixAlyTiz(PO4)3, $0<x<2$, $0<y<1$, $0<z<3$), (Li-AlTiP)$_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ type glass ($Li_xSi_yS_z$, $0<x<3$, $0<y<2$, $0<z<4$), $P_2S_5$ type glass ($Li_xP_yS_z$, $0<x<3$, $0<y<3$, $0<z<7$) particles, and a mixture thereof.

8. The method for manufacturing a separator according to claim 1, wherein the binder polymer is selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide, and a mixture thereof.

9. The method for manufacturing a separator according to claim 1, wherein the weight ratio of the inorganic particles and the binder polymer is in the range of 50:50 to 99:1.

10. The method for manufacturing a separator according to claim 1, wherein the contact angle of the binder solution to the surface of the porous coating layer maintains in the range of 80° to 130° for 30 seconds.

11. The method for manufacturing a separator according to claim 1, wherein the surface energy of the binder solution is higher than that of the porous coating layer by 10 to 50 mN/m.

12. The method for manufacturing a separator according to claim 1, wherein the polymer is used in an amount of 1 to 50 parts by weight based on 100 parts by weight of the solvent.

13. A separator manufactured by the method according to claim 1.

14. An electrochemical device, comprising a cathode, an anode, and a separator interposed between the cathode and the anode,
   wherein the separator is the separator according to claim 13.

15. The electrochemical device according to claim 14, which is a lithium secondary battery.

* * * * *